(12) United States Patent
Baik

(10) Patent No.: US 9,594,422 B2
(45) Date of Patent: Mar. 14, 2017

(54) TERMINAL APPARATUS AND METHOD FOR CONTROLLING THEREOF

(71) Applicant: SAMSUNG ELECTRONICS CO., LTD., Suwon-si (KR)

(72) Inventor: Seung-gil Baik, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 14/566,935

(22) Filed: Dec. 11, 2014

(65) Prior Publication Data

US 2015/0177819 A1 Jun. 25, 2015

(30) Foreign Application Priority Data

Dec. 24, 2013 (KR) ........................ 10-2013-0162601

(51) Int. Cl.
*G06F 1/32* (2006.01)
*G06F 9/44* (2006.01)

(52) U.S. Cl.
CPC .......... *G06F 1/3287* (2013.01); *G06F 9/4401* (2013.01); *G06F 9/4418* (2013.01)

(58) Field of Classification Search
CPC ..... G06F 1/3287; G06F 9/4401; G06F 9/4418
See application file for complete search history.

(56) References Cited

U.S. PATENT DOCUMENTS

| RE36,801 E * | 8/2000 | Logan .................. H04N 5/44 348/571 |
| 2006/0224875 A1 | 10/2006 | Choi et al. |
| 2007/0277051 A1 * | 11/2007 | Reece .................. G06F 1/3203 713/323 |
| 2008/0129884 A1 * | 6/2008 | Ryu .................. H04N 5/50 348/731 |
| 2008/0246888 A1 * | 10/2008 | Oh .................. H04N 5/4401 348/730 |
| 2011/0003570 A1 | 1/2011 | Yu et al. |
| 2012/0166840 A1 | 6/2012 | Rothman et al. |

FOREIGN PATENT DOCUMENTS

| KR | 10-2005-0102419 A | 10/2005 |
| KR | 10-2012-0116754 A | 10/2012 |

OTHER PUBLICATIONS

Comm. dated Feb. 24, 2015 issued by the Int. Searching Authority in counterpart Application No. PCT/KR2014/012038 (PCT/ISA/210).

Comm. dated Feb. 24, 2015 issued by the Int. Searching Authority in counterpart Application No. PCT/KR2014/012038 (PCT/ISA/237).

\* cited by examiner

*Primary Examiner* — M Elamin
(74) *Attorney, Agent, or Firm* — Sughrue Mion, PLLC

(57) ABSTRACT

A terminal apparatus and a controlling method thereof, the method comprising selecting, while the terminal apparatus is in an active mode, at least one channel from among a plurality of channels, receiving a broadcast signal corresponding to the selected channel, and outputting the received broadcast signal; storing, in a memory of the terminal apparatus, replay information related to the selected channel, and, in response to a power off command, converting the terminal apparatus from the active mode to a waiting mode; and in response to a power on command to convert the terminal apparatus from the waiting mode to the active mode, receiving a broadcast signal through the selected channel based on the replay information stored in the memory, wherein, in the waiting mode, power is supplied to the memory.

16 Claims, 5 Drawing Sheets

TERMINAL APPARATUS AND METHOD FOR CONTROLLING THEREOF

CROSS-REFERENCE TO RELATED APPLICATIONS

This application claims priority from Korean Patent Application No. 10-2013-0162601, filed in the Korean Intellectual Property Office on Dec. 24, 2013, the disclosure of which is incorporated herein by reference in its entirety.

BACKGROUND

1. Field

Methods and apparatuses consistent with exemplary embodiments relate to a terminal apparatus and a controlling method thereof, and more particularly, to a terminal apparatus capable of operating in a low power waiting mode and a controlling method thereof.

2. Description of the Related Art

A related art terminal apparatus capable of operating in a low power waiting mode supplies regular power to a receiver configured to receive a control signal from a remote control, such as a sub micom, for controlling the supply of general power to all elements of the terminal apparatus.

That is, in the related art terminal apparatus that is powered on and is thus operating in an active mode, when a power off command is input, general power supply to each element of the terminal apparatus may be shut off, and then regular power may be supplied to elements related to the sub micom and receiver of among the elements and thus operate in a low power waiting mode.

Likewise, when a power on command for operating in an active mode is input while the terminal apparatus is operating in a low power waiting mode, the terminal apparatus would start to perform a series of system booting processes. That is, a related art terminal apparatus performs system booting of the terminal apparatuses whenever converting from a lower power waiting mode to an active mode.

As aforementioned, a related art terminal apparatus boots the system of the terminal apparatus whenever converting from a low power waiting mode to an active mode, causing a problem of too much time being spent in converting from a low power waiting mode to an active mode.

SUMMARY

One or more exemplary embodiments provide a terminal apparatus capable of quickly converting from a low power waiting mode to an active mode, and a controlling method thereof.

According to an aspect of an exemplary embodiment, there is provided a controlling method of a terminal apparatus capable of receiving a broadcast, the method including: selecting, while the terminal apparatus is in an active mode, at least one channel of among a plurality of channels, and receiving a broadcast signal and outputting the received broadcast signal corresponding to the selected channel; storing, in a memory of the terminal apparatus, replay information related to the selected channel, and, in response to a power off command, converting the terminal apparatus from the active mode to a waiting mode; and, in response to a power on command to convert the terminal apparatus from the waiting mode to the active mode, receiving the broadcast signal through the selected channel based on the replay information stored in the memory, wherein, in the waiting mode, power is supplied to the memory.

General power may be supplied to all elements of the terminal apparatus while the terminal apparatus is in the active mode, and regular power may be supplied to the memory, a receiver, and a controller controlling each element of among all the elements of the terminal apparatus while the terminal apparatus is in the waiting mode.

The memory may be a volatile memory.

The method may further include transmitting, while the terminal apparatus is in the waiting mode and the replay information is stored in the memory, to the memory a control command for the memory to operate in a refresh mode, and performing a refresh operation periodically, by the memory, regarding the stored replay information, in response to the control command.

The method may further include, in response to general power being supplied to the memory operating in a refresh mode, converting the memory may convert from the refresh mode to a general mode and operating the memory in the general mode.

The replay information may include at least one of channel frequency information, identification information, AV output information, and Conditional Access System (CAS) information of the channel selected before the conversion was made to the waiting mode.

The controlling method of a terminal apparatus may further include, in response to initial power being supplied, storing in the memory an operating system and application stored in a boot memory of the terminal apparatus and executing the stored operating system and application.

The boot memory may be a nonvolatile memory.

According to an aspect of another exemplary embodiment, there is provided a terminal apparatus including: a power supply; a receiver configured to select at least one channel from among a plurality of channels and to receive a broadcast signal corresponding to the selected channel; an output unit configured to output the received broadcast signal corresponding to the selected channel; and a controller configured to, in response to a power off command being received while the terminal apparatus is in an active mode, store replay information related to the selected channel in a memory replay and convert the terminal apparatus to a waiting mode, and to control, in response to a power on command to convert the terminal apparatus to the active mode while the terminal apparatus is in the waiting mode, the receiver to receive the broadcast signal through the channel selected before the conversion was made to the waiting mode based on the replay information stored in the memory, and, while the terminal apparatus is in the waiting mode, control the power supply to supply power to the memory.

The controller may be further configured to, while the terminal apparatus is in the active mode, control the power supply to supply general power to all elements of the terminal apparatus, and to, while the terminal apparatus is in the waiting mode, control the power supply to supply regular power to the memory, receiver, and controller from among all the elements configuring the terminal apparatus.

The memory may be a volatile memory.

In addition, the controller may, while the terminal apparatus is in the waiting mode and the replay information is stored in the memory, control the memory to operate in a refresh mode and the memory may, in response to a control command, periodically perform a refresh operation regarding stored replay information.

The memory may, in response to general power being supplied to the memory operating in the refresh mode, convert from the refresh mode to a general mode and operates in the general mode.

The replay information may include at least one of channel frequency information, identification information, AV output information, and CAS information of the channel selected before the conversion was made to the waiting mode.

The terminal apparatus may further include a boot memory configured to store an operating system and application for driving the terminal apparatus, wherein the controller may store, in response to initial power being supplied, in the memory the operating system and application stored in the boot memory and execute the stored operating system and application.

The boot memory may be a nonvolatile memory.

According to an aspect of an exemplary embodiment, there is provided a controlling method of a terminal apparatus capable of receiving a broadcast, the method including: selecting, while the terminal apparatus is in an active mode, at least one channel from among a plurality of channels, and receiving a broadcast signal corresponding to the selected channel; in response to a power off command, storing replay information related to the selected channel in a volatile memory of the terminal apparatus and converting the terminal apparatus from the active mode into a waiting mode; supplying regular power to the volatile memory while in the waiting mode; and, in response to a power on command, converting the terminal apparatus from the waiting mode to the active mode and receiving the broadcast signal corresponding to the selected channel based on the replay information stored in the volatile memory.

The method may further include supplying, while the terminal apparatus is in the waiting mode, regular power to only the memory, a receiver, and a controller from among the elements of the terminal apparatus.

According to an aspect of an exemplary embodiment, there is provided a terminal apparatus including: a power supply; a receiver configured to, while the terminal apparatus is in an active mode, select at least one channel of among a plurality of channels and to receive a broadcast signal corresponding to the selected channel; a volatile memory; and a controller configured to, in response to a power off command being received while the terminal apparatus is in the active mode, store replay information related to the selected channel in the volatile memory and convert the terminal apparatus from the active mode to a waiting mode, to control the power supply to supply regular power to the volatile memory while in the waiting mode, and, in response to a power on command being received while the terminal apparatus is in the waiting mode, to control the receiver to receive the broadcast signal corresponding to the selected channel based on the replay information stored in the volatile memory.

The controller may be further configured to, while the terminal apparatus is in the waiting mode, control the power supply to supply regular power to only the memory, the receiver, and the controller from among the elements of the terminal apparatus.

BRIEF DESCRIPTION OF THE DRAWINGS

The above and/or other aspects of will be more apparent by describing certain exemplary embodiments with reference to the accompanying drawings, in which.

DETAILED DESCRIPTION

Figure 1:
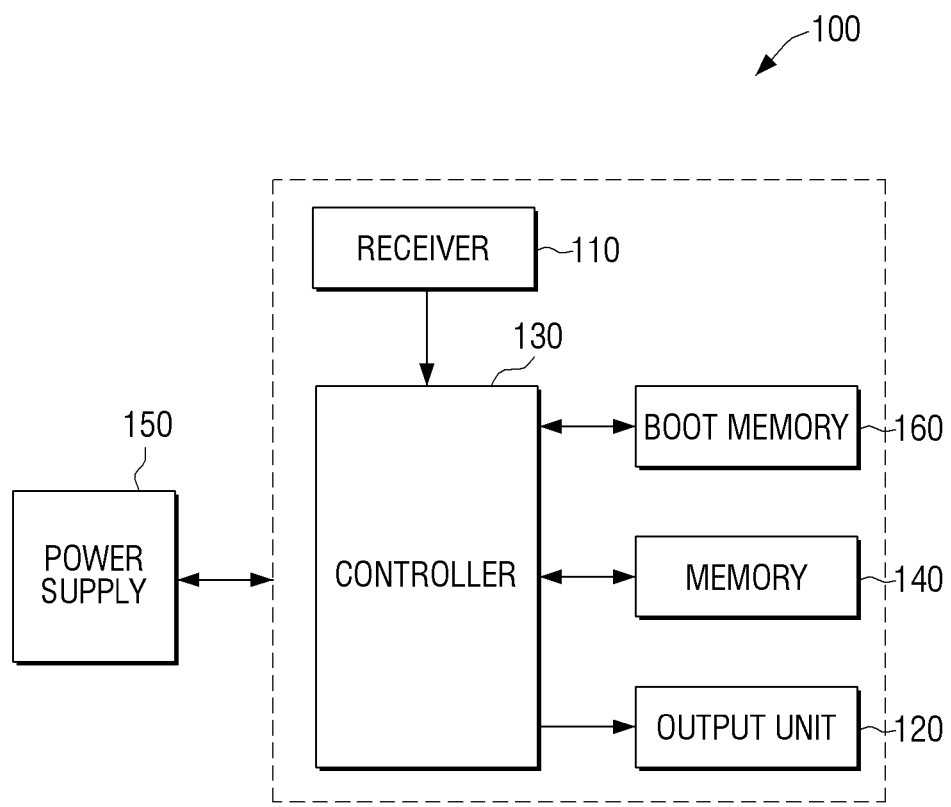
FIG. 1 is a block diagram illustrating a schematic configuration of a terminal apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 2:
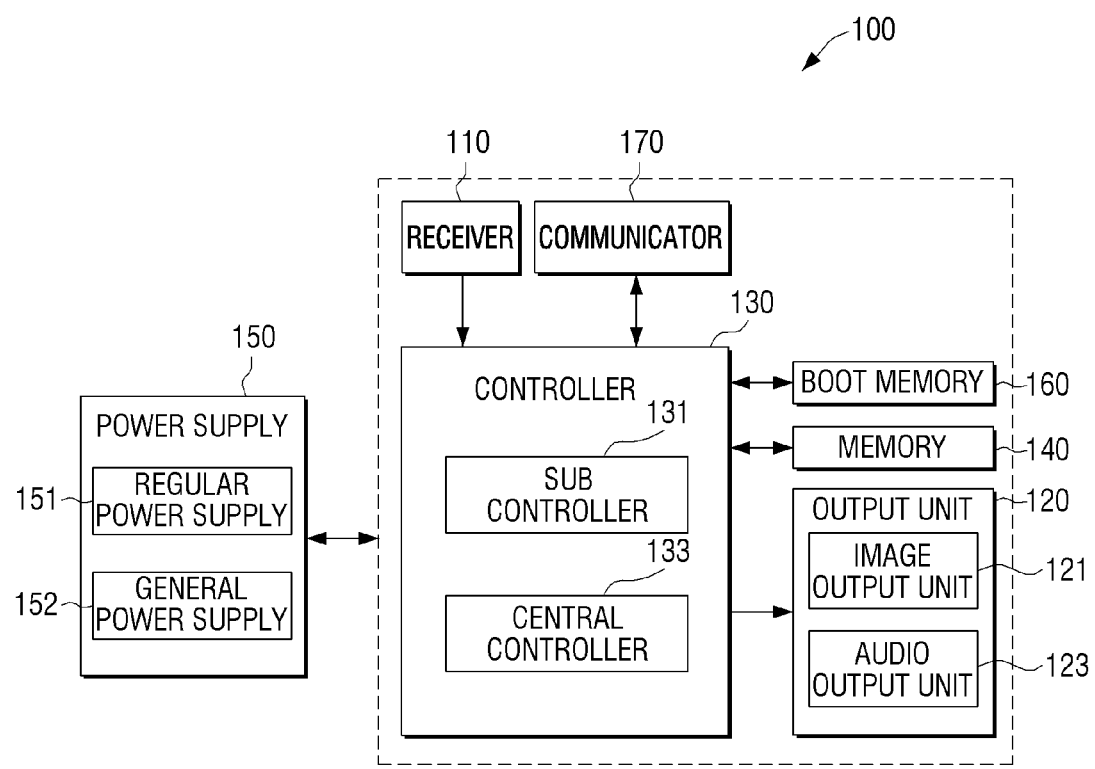
FIG. 2 is a block diagram illustrating a detailed configuration of a terminal apparatus according to an exemplary embodiment.

FIG. 1 is a block diagram illustrating a schematic configuration of a terminal apparatus according to an exemplary embodiment, and FIG. 2 is a block diagram illustrating a more detailed configuration of a terminal apparatus according to an exemplary embodiment.

As illustrated in FIG. 1, the terminal apparatus 100 is a terminal apparatus capable of receiving a broadcast such as a Set Top Box, smart television (TV), and smart phone. The terminal apparatus 100 comprises a receiver 110, output unit 120, controller 130, memory 140 and power supply 150.

The receiver 110 selects at least one channel of among a plurality of channels and receives a broadcast signal. According to an exemplary embodiment, the receiver 110 may select an initially determined viewing channel through a tuner (not illustrated) and receive a broadcast signal. According to another exemplary embodiment, when channel information is received from a remote control (not illustrated) or channel information is input through an input unit (not illustrated), the receiver 110 may select a channel corresponding to a channel information through the tuner (not illustrated) and receive a broadcast signal.

Such a receiver 110 may have a plurality of tuners (not illustrated), and may select a plurality of channels through the plurality of tuners (not illustrated), and may receive a broadcast signal from each of the selected channels.

The output unit 120 outputs the broadcast signal received from the selected channel through the receiver 110. According to an exemplary embodiment, in a case where the terminal apparatus 100 is a Set Top Box, when a broadcast signal comprising audio and image data is received from the selected channel through the receiver 110, the output unit 120 may output the broadcast signal comprising the audio and image data to a display apparatus (not illustrated) physically connected to the terminal apparatus. Accordingly, the display apparatus (not illustrated) may decode the audio and image data, and output the decoded audio and video data.

According to another exemplary embodiment, in a case where the terminal apparatus 100 is a display apparatus such as a smart TV, the output unit 120 may comprise an image output unit 121 and audio output unit 123, as shown in FIG. 2. In this case, the image output unit 121 may decode the image data included in the broadcast signal and output the decoded image data, and the audio output unit 123 may decode the audio data included in the broadcast signal and output the decoded audio data.

In a case where the terminal apparatus 100 is a display apparatus such as a smart TV, as illustrated in FIG. 2, the terminal apparatus 100 may further comprise a communicator 170 configured to perform wireless communication with an external server (not illustrated) that provides broadcast content. More specifically, according to a user's request, the communicator 170 performs wireless communication with the external server (not illustrated) and receives the broadcast content from the external server (not illustrated). Such a communicator 170 may perform wireless communication with the external server (not illustrated) in various wireless communication standards, such as WiFi, 3G (3rd Generation), 3GPP (3rd Generation Partnership Project), LTE (Long Term Evolution), etc., and receive broadcast content. The communicator 170 may be embodied as a communication module such as a broadcast communication module (not illustrated), and receive a broadcast signal being transmitted from a broadcasting station (not illustrated) through a broadcast communication antenna (not illustrated).

When a power off command is input into the controller 130 while the terminal apparatus is in an active mode, the controller 130 stores replay information related to the selected channel in the memory 140 and then converts to a waiting mode. Herein, the replay information may comprise at least one of channel frequency information, identification information for identifying a channel number, AV output information and CAS (Conditional Access System) information of the channel selected before the conversion was made to the waiting mode.

When converting from an active mode to a waiting mode upon receiving a power off command, the controller 130 controls the power supply 150 to supply power to the memory 140. Upon such a control command, the power supply 150 supplies predetermined regular power to the memory 140. Herein, the memory 140 that stores replay information related to the selected channel may be a volatile memory such as for example SDRAM.

While regular power is supplied to the memory 140 where the replay information related to the preselected channel is stored, the controller 130 controls the controller 130 controls the memory 140 to operate in a refresh mode. Upon such a control command, the memory 140 that is supplied with regular power from the power supply 150 periodically performs a refresh operation regarding the prestored replay information. Accordingly, it is possible to continuously store the replay information stored in the memory 140 while minimizing the power consumption supplied to the memory 140.

When the operating mode of the terminal apparatus 100 converts from a waiting mode to an active mode and general power is supplied from the power supply 150, the memory 140 may convert from the refresh mode to a general mode, and continuously store regarding the prestored replay information.

Meanwhile, when converting to a waiting mode upon a power off command, the power supply 150 desirably supplies regular power to not only the memory 140 but also the receiver 110 that receives a control command from a remote control (not illustrated), and the controller 130 that performs the overall controlling of each element of the terminal apparatus 100. As such, when a power on command is received while the terminal apparatus is in a waiting mode and supplying regular power to the receiver 110, controller 130, and memory 140, the controller 130 controls the power supply 150 to supply general power to all elements that configure the terminal apparatus 100. Accordingly, the power supply 150 may supply general power to all elements that configure the terminal apparatus 100, thereby enabling the terminal apparatus 100 to operate in an active mode.

Meanwhile, according to additional aspects of one or more exemplary embodiments, the terminal apparatus 100 further comprises a boot memory 160. The boot memory 160 is a memory that stores an operating system and application for driving the terminal apparatus 100. Such a boot memory 160 may be nonvolatile memory such as a flash memory.

Therefore, when initial power is supplied to the terminal apparatus 100 through the power supply 150, the controller 130 performs a loading of the operating system and application prestored in the boot memory 160 so that the terminal apparatus 100 may operate in an active mode, and stores the result in the memory 150 that is a volatile memory. That is, when initial power is supplied to the terminal apparatus 100 through the power supply 150, the controller 130 performs a loading of the operating system and application stored in the boot memory 160, enabling the terminal apparatus 100 to operate in an active mode.

More specifically, when initial power is supplied to the terminal apparatus 100 through the power supply 150, the controller 130 stores a boot loader, stored in the boot memory 160, in the memory 140, and executes the boot loader stored in the memory 140 and executes the operating system for setting a hardware and software, so as to boot the terminal apparatus 100. More specifically, as illustrated in FIG. 2, the controller 130 may comprise a sub controller 131 configured to control the power supply 150 to supply general power or regular power to each element of the terminal apparatus 100 and a central controller 133 configured to control operations of each elements. In addition, the power supply 150 may comprise a regular power supply 151 configured to supply regular power to the receiver 110, controller 130 and memory 140 so that the terminal apparatus 100 may operate in a waiting mode and a general power supply 153 configured to supply general power to each element of the terminal apparatus 100 so that the terminal apparatus 100 may operate in an active mode.

Therefore, when initial power is supplied to the terminal apparatus 100, the regular power supply 151 applies regular power to the sub controller 131. When regular power is supplied from the regular power supply 151, the sub controller 131 controls the general power supply 153 to supply general power to each element of the terminal apparatus 100. Accordingly, the general power supply 153 supplies power to each element of the terminal apparatus 100, and the controller 130 that received general power stores in the memory 140 various application programs prestored according to the command stored in the boot memory 160, and executes a plurality of application programs stored in the memory 140 and performs operations regarding each application. Since an initial booting process of a terminal apparatus 100 is well-known, detailed explanation there is omitted herein.

Meanwhile, the plurality of application programs being executed according to the control command of the central controller 133 of the controller 130 may comprise tuner related application programs for receiving a broadcast signal. Therefore, after a system booting of the terminal apparatus 100 is completed, when the plurality of application programs are executed, the receiver 110 may select a channel predetermined through a tuner related application program or a channel corresponding to a user's request of among the plurality of application programs and receive a broadcast signal.

Hereinbelow is explanation on an operation of creating a system hierarchy for driving a terminal apparatus 100 in a memory 140 according to an initial booting in the terminal apparatus 100.

Figure 3:
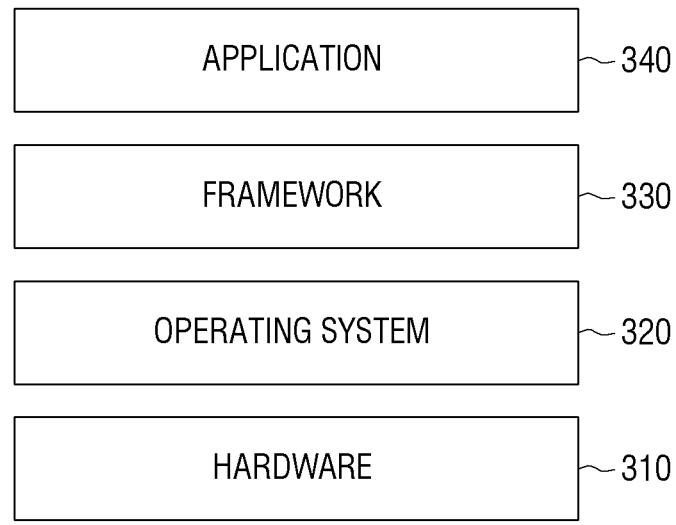
FIG. 3 illustrates a system hierarchy of a terminal apparatus according to an exemplary embodiment.

FIG. 3 is an exemplary view of a system hierarchy according to an initial booting of a terminal apparatus according to an exemplary embodiment.

As illustrated in FIG. 3, the system hierarchy according to an initial booting of the terminal apparatus 100 may comprise a hardware 310, an operating system (OS) 320 that drives the hardware 310, application hierarchy 340 that uses resources managed in processes by the operating system and provides user service, and a framework hierarchy 330 that relays between the operating system and the application.

The operating system 320 controls the overall operations of the hardware 310 and performs the function of managing the processes corresponding to various applications and hardware 310. That is, the operating system 320 is in charge of basic functions such as hardware management, memory, security, etc. In addition, the operating system 320 comprises modules such as, as non-limiting examples, a display driver for driving the image output unit 121 for outputting images, a communication driver for transmitting and receiving data, a camera driver for driving a camera, an audio driver for driving the audio output unit 123, a tuner driver for receiving a broadcast signal, and a power manager. In addition, an API library and runtime accessible by the developer may be included. Such an operating system processes a call of an application, and operates the hardware according to the processing results.

At a higher level of hierarchy than the operating system, there is a framework hierarchy 330. The framework hierarchy 330 performs the role of connecting the application hierarchy 340 and the operating system hierarchy 320. That is, the framework hierarchy 330 comprises a frame buffer for displaying an image through a location manager, notification manager, and image output unit 121.

At a higher level of hierarchy than the framework hierarchy 330, there is an application hierarchy 340 where various functions of the terminal apparatus 100 are embodied. Such an application hierarchy 340 may comprise various application programs, and especially, may comprise application programs for driving the tuner driver and selecting a channel. When the tuner driver for selecting a channel is executed according to an execution of such an application program, the receiver 110 selects a predetermined channel or a channel corresponding to the user's request and receives a broadcast signal.

When initial power is supplied to the terminal apparatus 100, the controller 130 according to the present disclosure stores the operating system and application prestored in the boot memory 160 in the memory, and executes the stored operating system and application. Accordingly, when an operating mode of the terminal apparatus 100 operates in an active mode, the receiver 110 may select a predetermined channel or a channel corresponding to the user's request and receive a broadcast signal, and the output unit 120 may perform a signal processing and outputting regarding the image and audio data included in the broadcast signal through the image output unit 121 and audio output unit 123.

As such, with the terminal apparatus 100 operating in an active mode and thus receiving a broadcast signal through a preselected channel, when a power off command is received from a remote control (not illustrated) through the receiver 110, the controller 130 stores replay information related to the selected channel in the memory 140. Next, the controller 130 converts the operation mode of the terminal apparatus 100 from an active mode to a waiting mode upon a power off command. That is, the controller 130 controls the power supply 150 to supply regular power to the receiver 100, memory 140, and controller 130 among the elements configuring the terminal apparatus 100.

Upon such a control command, the power supply 150 shuts off supply of general power being supplied to each element of the terminal apparatus through the general power supply 153, and supplies regular power of a predetermined amount to the receiver 100, memory 140 and controller 130 through the regular power supply 151.

When such regular power is supplied, the controller 130 controls the memory 140 that is a volatile memory to operate in a refresh mode. According to such a control command, the memory 140 that is supplied with regular power through the power supply 151 periodically performs a refresh operation regarding the prestored replay information. Accordingly, the replay information stored in the memory 140 may continuously be stored in the memory 140 while minimizing the power consumption being supplied to the memory 140.

As such, with the terminal apparatus 100 operating at a state of a waiting mode, when a power on command for operating in an active mode is received from the remote control (not illustrated) through the receiver 110 or a power on command is input through the input unit (not illustrated), the controller 130 controls so that general power may be supplied to the power supply 150 through the sub controller 131. Accordingly, the regular power supply 151 shuts off the regular power supply to the receiver 110, controller 130 and memory 140 of the terminal apparatus 100, and the general power supply 153 supplies general power to each element configuring the terminal apparatus 100.

When general power is supplied, the memory 140 converts to operate in a general mode, and the controller 130 receives a broadcast signal through the channel selected before the conversion was made to the waiting mode based on the replay information prestored in the memory 140 through the central controller 133, and controls the receiver 110 and output unit 120 to output the received broadcast signal.

Accordingly, the receiver 110 may select a channel based on the channel frequency information and identification information included in the corresponding replay information, receives the broadcast signal through the selected channel, and the output unit 120 may perform signal processing and outputting of the image and audio data included in the broadcast signal based on the AV output information included in the replay information.

As such, when the terminal apparatus 100 that received initial power and is at a state of operating in an active mode is to convert to a waiting mode, the terminal apparatus 100 may perform operations based on the booting related information and the replay information for receiving the broadcast signal prestored in the memory 140, thereby improving the speed of converting from a waiting mode to an active mode compared to prior art.

Aforementioned was detailed explanation on each element of the terminal apparatus 100 according to an exemplary embodiment. Hereinbelow is detailed explanation on the controlling method for a quick conversion of the operating mode in a terminal apparatus 100 according to one or more exemplary embodiments.

Figure 4:
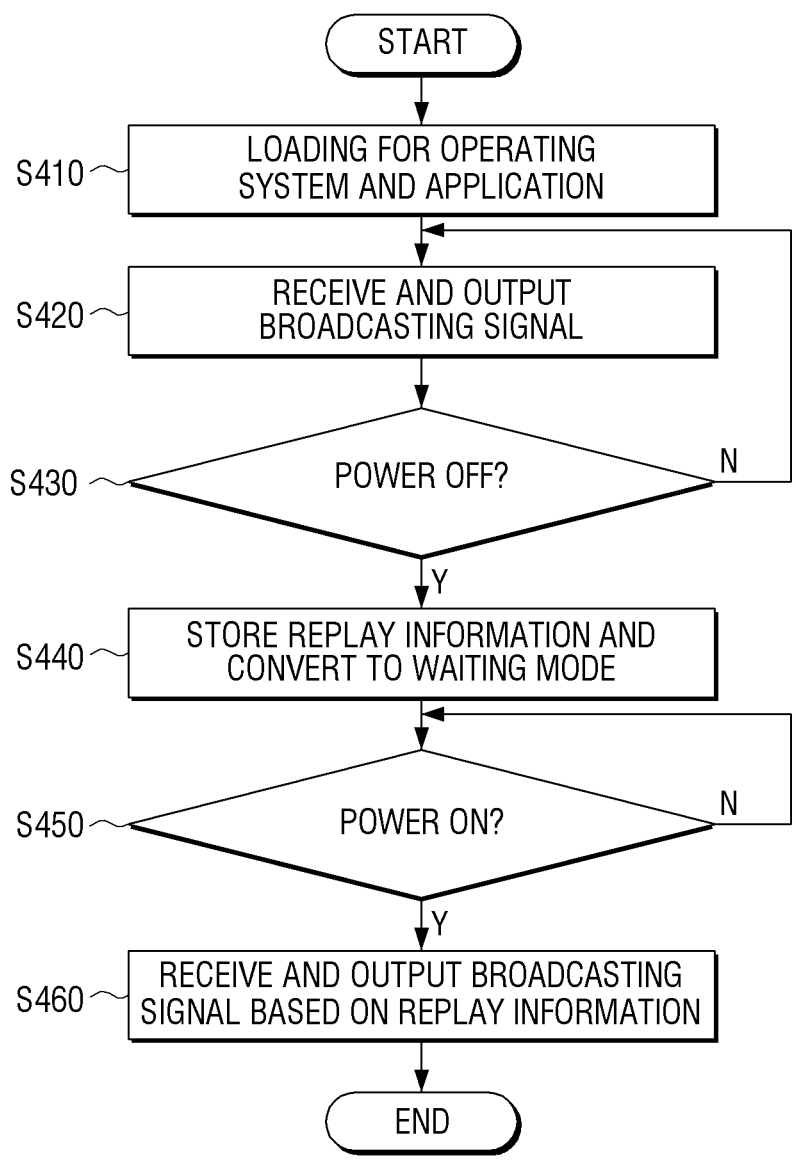
FIG. 4 is a flowchart of a controlling method of a terminal apparatus according to an exemplary embodiment.

FIG. 4 is a flowchart of a controlling method of a terminal apparatus according to an exemplary embodiment.

As illustrated in FIG. 4, when initial power is supplied from outside, the terminal apparatus 100 stores in the memory the operating system and application prestored in the boot memory and executes the stored operating system and application (S410). Herein, the boot memory is a memory for storing an operating system and application for driving the terminal apparatus 100. And such a boot memory may be a nonvolatile memory such as a flash memory. In addition, the memory may also be a volatile memory such as SDRAM.

More specifically, when initial power is supplied, the terminal apparatus 100 stores in the memory a boot loader stored in the boot memory, and executes the boot loader stored in the memory (hereinafter referred to as volatile memory) to execute the operating system for setting the hardware and software so as to boot the system. Next the terminal apparatus 100 executes various application programs that may be performed in the terminal apparatus 100. Accordingly, the terminal apparatus 100 selects a predetermined channel or a channel corresponding to the user's request through the tuner related application of among the plurality of application programs, and performs signal processing of the image and audio data included in the received broadcast signal and outputs the signal processed image and audio data (S420).

Hereinbelow is a detailed explanation on a booting method of the terminal apparatus 100, during an initial power supply to the terminal apparatus 100.

Figure 5:
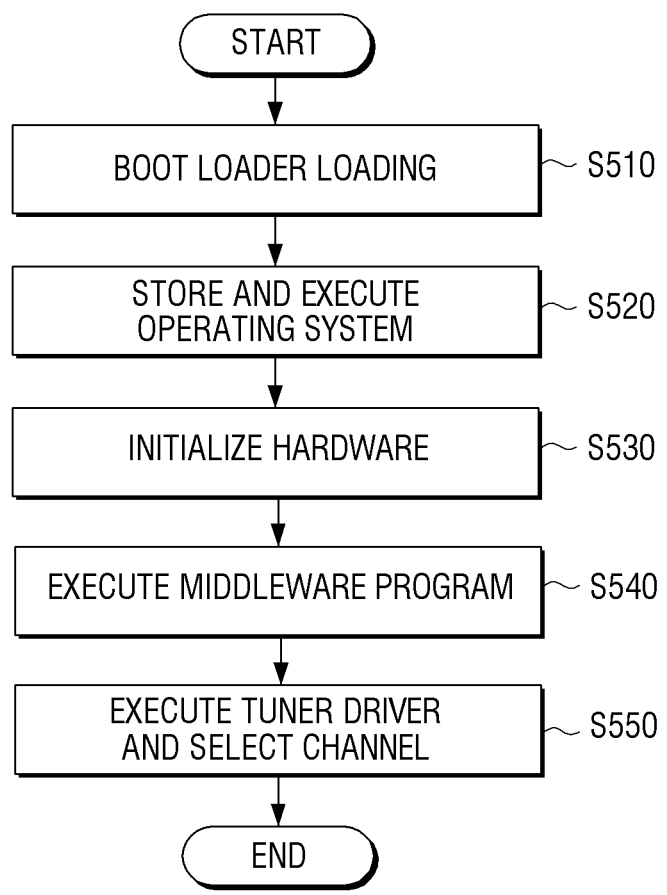
FIG. 5 is a flowchart of a booting method during an initial power supply in a terminal apparatus according to an exemplary embodiment.

FIG. 5 is a flowchart of the booting method during initial power supply in a terminal apparatus according to an exemplary embodiment.

As illustrated in FIG. 5, when initial power is supplied from outside, the terminal apparatus 100 stores in the volatile memory the boot loader stored in the boot memory, and executes the boot loader stored in the memory (S510). When the boot loader is executed, the terminal apparatus 100 controls the overall operations of the hardware, stores in the volatile memory the hardware and the operating system of managing the process corresponding to each application, and executes the operating system stored in the volatile memory (S520). As such, when the operating system stored in the volatile memory is executed, a kernel and root file system is loaded, and a system booting for operating the terminal apparatus 100 is performed.

Next, the terminal apparatus 100 performs initialization of the hardware of the terminal apparatus 100 (S530). Herein, the hardware may be an interface, such as, for example, a memory, a tuner, and an HDMI, USB, Ethernet, and serial port. When the initialization setting of the hardware is completed, the terminal apparatus 100 executes a middleware program (S540). Herein, the middleware program may be an application program that includes an application for embodying various functions of the terminal apparatus 100. Such an application program may include an application for driving a tuner driver that performs channel selection for receiving a broadcast signal.

Therefore, when the middleware program is executed, the terminal apparatus may select a channel corresponding to the corresponding channel information based on the channel information predetermined through the application driving the tuner driver for channel selection or the channel information received or input according to the user's request, and receive a broadcast signal (S550).

Accordingly, when a broadcast signal is received through the selected channel, the terminal apparatus 100 may perform signal processing such as decoding of the image and audio data included in the received broadcast signal, and output the signal processed image and audio data. That is, the terminal apparatus 100 may output the image and audio data included in the broadcast signal selected from the corresponding channel until a power off command is received for operating in a waiting mode.

Meanwhile, with the terminal apparatus 100 outputting the image and audio data regarding the broadcast signal received from the selected channel, when a power off command for operating in a waiting mode is received (S430), the terminal apparatus 100 stores in the volatile memory the replay information related to the selected channel, and converts the operating mode of the terminal apparatus 100 from an active mode to a waiting mode (S440).

Herein, the replay information may comprise at least one of channel frequency information, identification information for identifying the channel number, AV output information, and CAS (Conditional Access System) information of the channel selected before the conversion was made to the waiting mode.

An active mode is an operating mode at a state where general power is being supplied to all elements configuring the terminal apparatus 100, and a waiting mode may be an operating mode at a state where regular power is being supplied to the controller that controls the volatile memory that stores information related to system booting and replay information related to the selected channel, the receiver that receives a control signal from the remote control (not illustrated), and the controller that controls operations of each element.

Therefore, when a power off command for operating in a waiting mode is received (S430), the terminal apparatus 100 stores in the volatile memory the replay information related to the currently selected channel, shuts off general power supply being supplied to each element of the terminal apparatus 100, and supplies regular power of a predetermined amount to the receiver, the volatile memory, and the controller, thereby operating in a waiting mode (S440). That is, the terminal apparatus 100 may operate in a waiting mode that supplies regular power to some elements including the volatile memory until receiving a power on command for operating in an activating mode.

Meanwhile, when regular power is supplied to the volatile memory, the terminal apparatus 100 controls the volatile memory to operate in a refresh mode. Accordingly, the volatile memory may continuously store in the memory the replay information prestored in the volatile memory while minimizing the power consumption being supplied to the volatile memory by periodically performing a refresh operation on the prestored replay information.

As such, with the terminal apparatus operating in a waiting mode, when a power on command for operating in an active mode is received (S450), the terminal apparatus 100 receives a broadcast signal through the channel selected before the conversion was made to the waiting mode based on the replay information prestored in the volatile memory, and signal processes the image and audio data included in the received broadcast signal and outputs the signal processed image and audio data (S460).

More specifically, with the terminal apparatus operating in a waiting mode, when a power on command for operating in an active mode is received, the terminal apparatus 100 shuts off the regular power supply to some elements including the volatile memory, and supplies general power to all elements of the terminal apparatus 100. When general power is supplied, the terminal apparatus 100 may select a channel based on the channel frequency information and identification information included in the replay information prestored in the volatile memory, and may receive a broadcast signal through the selected channel. In addition, the terminal apparatus 100 may perform signal processing and outputting of the image and audio data included in the corresponding broadcast signal based on the AV output information included in the replay information prestored in the volatile memory.

As such, when general power is supplied to each element of the terminal apparatus 100, the volatile memory converts from the refresh mode to a general mode. Accordingly, the information related to system booting and replay information prestored in the volatile memory is continuously stored in the volatile memory. Therefore, when converting from a waiting mode to an active mode upon a power on command, the terminal apparatus 100 does not again perform a system related booting but may select a channel based on the replay information prestored in the volatile memory, and receive a broadcast signal through the selected channel, and output the received broadcast signal.

That is, when the terminal apparatus 100 according to the present disclosure is supplied with initial power and converts from an active mode to a waiting mode, the terminal apparatus 100 performs operations based on booting related information and replay information for receiving a broadcast signal prestored in the volatile memory, thereby improving the speed of converting from a waiting mode to an active mode compared to prior art.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A controlling method of a terminal apparatus capable of receiving a broadcast, the method comprising:
    selecting, while the terminal apparatus is in an active mode, at least one channel from among a plurality of channels, receiving a broadcast signal corresponding to the selected channel, and outputting the received broadcast signal;
    storing, in a memory of the terminal apparatus, replay information related to the selected channel, and, in response to a power off command, converting the terminal apparatus from the active mode to a waiting mode;
    in response to a power on command to convert the terminal apparatus from the waiting mode to the active mode, receiving a broadcast signal through the selected channel based on the replay information stored in the memory; and
    performing, by the memory while the terminal apparatus is in the waiting mode and the replay information is stored in the memory, a refresh operation periodically regarding the stored replay information,
    wherein, in the waiting mode, power is supplied to the memory.

2. The controlling method according to claim 1,
    wherein, while the terminal apparatus is in the active mode, general power is supplied to all elements of the terminal apparatus, and
    wherein, while the terminal apparatus is in the waiting mode, regular power is supplied to the memory, a receiver, and a controller from among the elements of the terminal apparatus.

3. The controlling method according to claim 1, wherein the memory is a volatile memory.

4. The controlling method according to claim 1, further comprising:
    transmitting, while the terminal apparatus is in the waiting mode and the replay information is stored in the memory, to the memory a control command for the memory to operate in a refresh mode, wherein the performing the refresh operation is in response to the control command.

5. The controlling method according to claim 4, further comprising:
    in response to general power being supplied to the memory operating in the refresh mode, converting the memory from the refresh mode to a general mode and operating the memory in the general mode.

6. The controlling method according to claim 1, wherein the replay information comprises at least one of channel frequency information, identification information, AV output information, and Conditional Access System (CAS) information of the channel selected before the conversion was made to the waiting mode.

7. The controlling method according to claim 2, further comprising:
    in response to initial power being supplied, storing in the memory an operating system and an application stored in a boot memory of the terminal apparatus; and
    executing the stored operating system and application.

8. The controlling method according to claim 7, wherein the boot memory is a nonvolatile memory.

9. A terminal apparatus comprising:
    a power supply;
    a receiver configured to select at least one channel from among a plurality of channels and to receive a broadcast signal corresponding to the selected channel;
    an output unit configured to output the received broadcast signal corresponding to selected channel; and
    a controller configured to, in response to a power off command being received while the terminal apparatus is in an active mode, store replay information related to the selected channel in a memory and convert the terminal apparatus to a waiting mode, in response to a power on command to convert the terminal apparatus to the active mode while the terminal apparatus is in the waiting mode, control the receiver to receive the broadcast signal through the channel selected before the conversion was made to the waiting mode based on the replay information stored in the memory, and while the terminal apparatus is in the waiting mode, control the power supply to supply power to the memory,
    wherein the memory is configured to, while the terminal apparatus is in the waiting mode and the replay information is stored in the memory, periodically perform a refresh operation regarding stored replay information.

10. The apparatus according to claim 9,
    wherein, the controller is further configured to, while the terminal apparatus is in the active mode, control the power supply to supply general power to all elements of the terminal apparatus, and
    wherein, the controller is further configured to, while the terminal apparatus is in the waiting mode, control the power supply to supply regular power to the memory, the receiver, and the controller from among all the elements configuring the terminal apparatus.

11. The apparatus according to claim 9, wherein the memory is a volatile memory.

12. The apparatus according to claim 9, wherein the controller is further configured to, while the terminal apparatus is in the waiting mode and the replay information is stored in the memory, control the memory to operate in a refresh mode, and wherein the memory is further configured to periodically perform the refresh operation in response to a control command.

13. The apparatus according to claim 12, wherein the memory is further configured to, in response to general power being supplied to the memory operating in the refresh mode, convert from the refresh mode to a general mode and operate in the general mode.

14. The apparatus according to claim 9, wherein the replay information comprises at least one of channel frequency information, identification information, AV output information, and Conditional Access System (CAS) information of the channel selected before the conversion was made to the waiting mode.

15. The apparatus according to claim 10, further comprising:

a boot memory configured to store an operating system and an application for driving the terminal apparatus, wherein the controller is further configured to store, in response to initial power being supplied, in the memory the operating system and an application stored in the boot memory, and to execute the stored operating system and application.

16. The apparatus according to claim 15, wherein the boot memory is a nonvolatile memory.

* * * * *